(No Model.)  10 Sheets—Sheet 1.

T. REEVE.
TYPE DISTRIBUTING MACHINE.

No. 245,562. Patented Aug. 9, 1881.

(No Model.)  10 Sheets—Sheet 4.

T. REEVE.
TYPE DISTRIBUTING MACHINE.

No. 245,562. Patented Aug. 9, 1881.

Witnesses
Otto Hufeland
William Miller

Inventor
Thomas Reeve.
by Van Santvoord & Hauff
his attys

(No Model.)　　　　　　　　　　　　　　　10 Sheets—Sheet 5.
T. REEVE.
TYPE DISTRIBUTING MACHINE.

No. 245,562.　　　　　　　　　Patented Aug. 9, 1881.

(No Model.) 10 Sheets—Sheet 8.

T. REEVE.
TYPE DISTRIBUTING MACHINE.

No. 245,562. Patented Aug. 9, 1881.

Witnesses
Otto Hufeland
William Miller

Inventor
Thomas Reeve
by Van Santvoord & Hauff
his attys (No Model.) 10 Sheets—Sheet 9.

T. REEVE.
TYPE DISTRIBUTING MACHINE.

No. 245,562. Patented Aug. 9, 1881.

Witnesses
Otto Hufeland
William Miller

Inventor
Thomas Reeve.
by Van Santvoord & Hauff
his attys

UNITED STATES PATENT OFFICE.

THOMAS REEVE, OF BROOKLYN, ASSIGNOR TO THE ALDEN TYPE MACHINE COMPANY, OF NEW YORK, N. Y.

TYPE-DISTRIBUTING MACHINE.

SPECIFICATION forming part of Letters Patent No. 245,562, dated August 9, 1881.

Application filed December 23, 1880. (No model.)

*To all whom it may concern:*

Be it known that I, THOMAS REEVE, a citizen of the United States, residing at Brooklyn, in the county of Kings and State of New York, have invented new and useful Improvements in Type-Distributing Machines, of which the following is a specification.

This invention relates to certain improvements in that class of machines for distributing types for which a patent was granted to Augustus C. Richards, February 18, 1879, No. 212,503, and in which the dead matter, column after column, is placed on a galley, thence fed, line after line, into a channel, from which the types are transferred, one after the other, into suitable cases arranged on the circumference of a cone, as will more fully appear from the following description.

This invention is illustrated in the accompanying drawings, in which Fig. 2 is a longitudinal vertical section in the plane $x\,x$, Fig. 3. Fig. 3 is a plan or top view. The remaining figures are details, which will be referred to as the description progresses.

Figure 1:
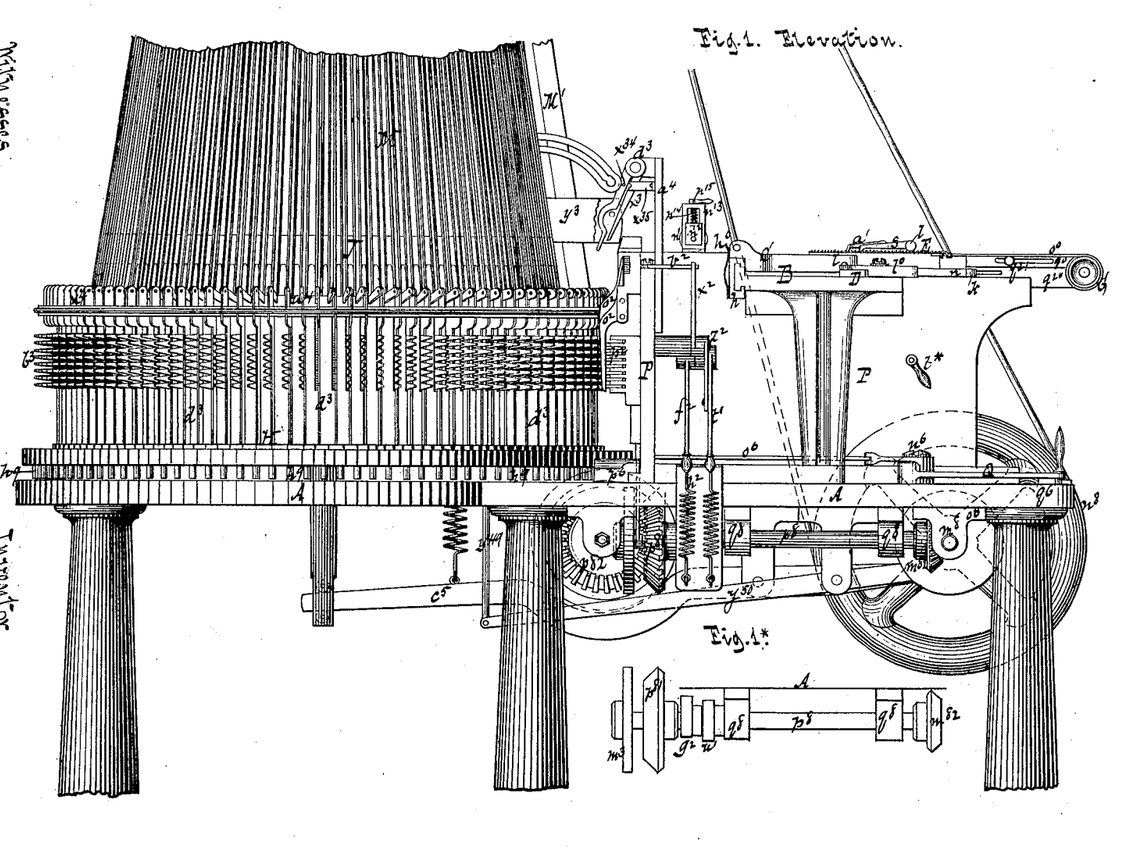
Figure 1 represents a side view.
Figures 2, 3:
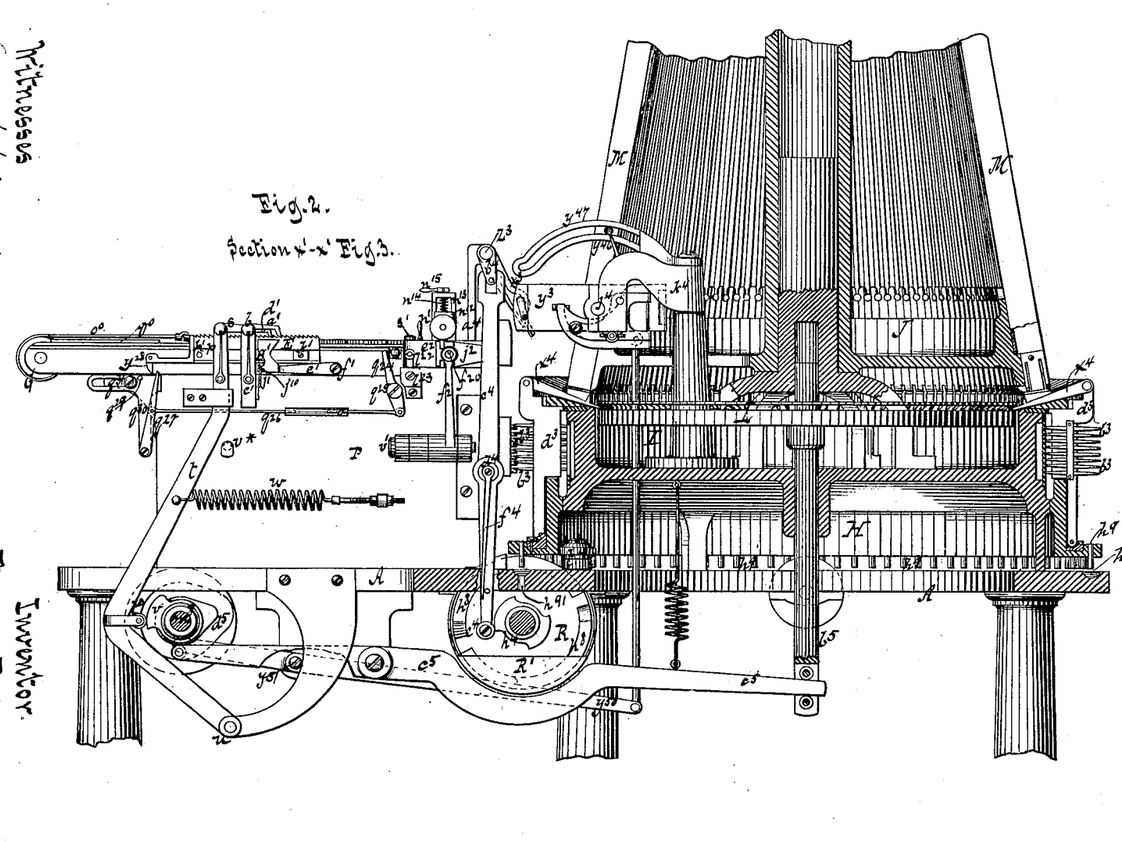
Figure 3:
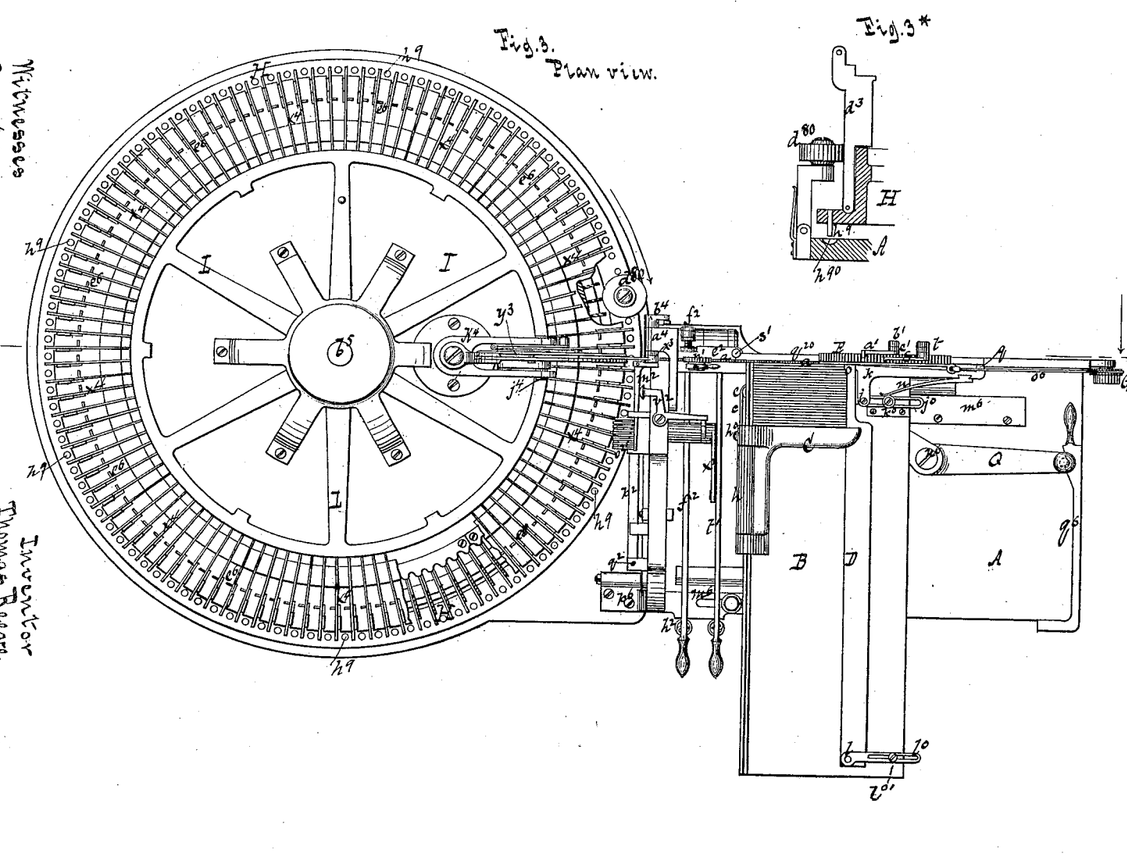

In the drawings, the letter A designates a frame, of cast-iron or any other suitable material, which supports on one end the galley, together with the mechanism for feeding the column and the lines, and for transferring the types, one after the other, to the distributing mechanism, which occupies the other end of the frame A, as shown in Figs. 1, 2, and 3.

B is the galley, on which is placed the dead matter to be distributed, one column after the other, and which is provided with a column-feeder, C, (see Figs. 3, 4, and 5,) by which the column is constantly pressed toward the type-channel $a$. The column-feeder is hinged to a slide, $h$, which is fitted on the edge of the galley, so that it slides thereon with ease, and it is exposed to the action of a coiled spring, which is inclosed in a barrel, $b$, (see Figs. 5 and 5*,) which connects with the slide $h$ by a cat-gut cord, $c$, running over a pulley, $e$. (See Figs. 3, 4, and 5.) The barrel $b$ is made in the form of a fusee, so that the strain exerted by said spring on the column-feeder decreases as the feeder moves toward the type-channel $a$. If the column-feeder is in its outward position, the cord $c$ is wound on the small portion of the fusee $b$; but as the column-feeder moves in the cord $c$ is taken up by the gradually increasing fusee, so as to reduce the strain on the column-feeder in proportion to the decrease of the matter to be pushed forward by said feeder. When the column on the galley is nearly exhausted the column-feeder is turned on its hinge to a vertical position, a fresh column is introduced into the galley, the column-feeder is drawn back against the action of the coiled spring in the barrel $b$, and then turned down again upon the galley, when it is drawn up against the last line of the column by the action of the coiled spring, as previously described. A spring, $h^0$, retains the column-feeder in position when it has been turned down or turned up. This spring is fastened to the slide $h$, as shown in Fig. 1, and its free end bears upon one of the knuckles of the column-feeder. (See also Fig. 4.)

The galley is adjusted to the width of the column by means of a side plate, D, (see Figs. 3 and 4,) which is fastened by a pivot, $l$, to a slotted plate, $l^0$, and this slotted plate is secured to the galley by a set-screw, $l^{0\prime}$, so that by releasing this set-screw the side plate, D, can be moved on the galley toward one side or the other. The inner or free end of the side plate is pressed up against the column of type by a bell-crank lever, $k$, which has its fulcrum on a pivot, $j$, (see Figs. 3 and 4,) and which is subjected to the action of a spring, $n$. The pivot $j$ is secured in a slotted plate, $j^0$, which is adjustable on the galley by a set-screw, $k^0$, so that the bell-crank lever $k$ can be adjusted to the width of the column. From the inner edge of the side plate projects a lip, $o$, (see Figs. 3 and 4,) which bears against that line of the column next to the line of type being fed by the line-feeder, so that the full pressure of the spring $n$ is brought to bear on said first line, and this line is held tight enough to form the inner wall of the type-channel $a$, and also to neutralize the pressure of the column-feeder and prevent the column of type from pressing against the line-feeder, which would interfere with the free action of said line-feeder on its return motion. By making the bell-crank lever adjustable the pressure exerted by it on the column side plate is rendered uniform at all times, and its releasing-nose $q$ is adjusted at the same time, as will be more fully explained hereinafter.

Figures 7, 8, 9, 10, 11, 12:
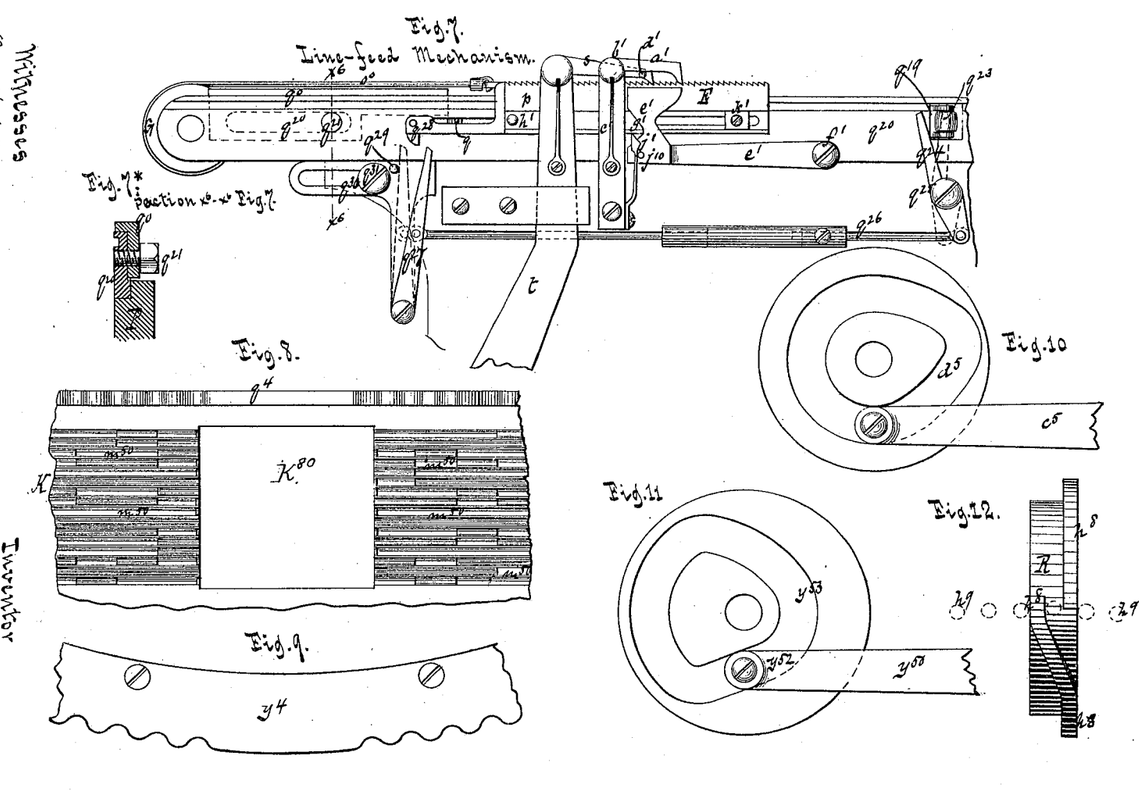

E is the line-feeder, which slides on the outer wall, $q^{20}$, of the type-channel $a$, and the motion of which is produced by mechanism shown in Figs. 2 and 7. The line-feeder connects by a cord, $o^0$, with a barrel, G, containing a coiled spring, and is provided with a downwardly-projecting flange, $p$, which serves to release the column side plate by striking against the nose $q$, projecting from the bell-crank lever $k$, whenever the line-feeder is allowed to follow the action of its spring. When a new line is to be fed into the type-channel $a$ the line-feeder flies back, and as the flange $p$ strikes the nose $q$ the column side plate D is relieved from the pressure of the bell-crank lever $k$, the first line of the column is released and the whole column can follow the action of the column-feeder. After the line-feeder has struck the nose $q$ it is arrested by a stop, $q^0$, which is fastened to the outer wall, $q^{20}$, of the type-channel by a screw, $q^{21}$, Figs. 4, 7, and 7*, and which is provided on its inner surface with teeth to engage with corresponding teeth on the wall $q^{20}$, so that it is not liable to be thrown out of its position by the repeated blows of the line-feeder to which it is exposed. The line-feeder is moved forward by a feed-pawl, $s$, which is attached to the upper end of a lever, $t$, that has its fulcrum on a pivot, $u$, (see Fig. 2,) and is subjected to the action of a cam, $v$, and of a spring, $w$. At the moment the low portion of said cam comes opposite the friction-roller $t^0$, secured to the lever $t$, the spring $w$ causes the line-feeder to advance until the line of type in the type-channel strikes the abutment at the extreme end of said channel; and as the motion of the cam proceeds the feed-pawl is drawn back, ready for a new forward motion, the line-feeder being retained in the meantime by a stop-pawl, $a'$, which swings on a pivot, $b'$, secured in a bracket, $c'$, which is firmly secured to the outer wall of the type-channel. The tension of the spring $w$ can be adjusted by a screw and nuts, as shown in Fig. 2. In the side of the feed-pawl is secured a pin, $d'$, Fig. 7, which extends beneath the stop-pawl $a'$, and under the feed-pawl is situated the gravitating-lever $e'$, which has its fulcrum on a pivot, $f'$, secured on the outside wall of the type-channel. In the front edge of the lever $e'$ is a recess, $g'$, and in the flange $p$ of the line-feeder is secured a pin, $h'$. When the line-feeder has reached the forward end of its stroke the pin $h'$ enters the recess $g'$ in the gravitating-lever $e'$, said lever is raised up and brought in contact with the pin $d'$ of the feed-pawl, the feed-pawl is lifted, and this pin $d'$ throws the stop-pawl $a'$ out of gear with the line-feeder, which, being thus free to follow the action of its spring, flies back. (Figs. 2 and 7.) At the moment it reaches the outer end of its stroke both pawls drop into gear with the line-feeder, and as soon as the cam $v$ allows it the spring $w$ draws the line-feeder up in contact with the line of type in the type-channel. To insure the action of the gravitating-lever $e'$ it is subjected to the action of the spring $j'$, which is so arranged that the same, after the gravitating-lever has been raised by the pin $h'$, acts on a pin, $j^{10}$, thereby causing the gravitating-lever to fly up and to throw the pawls out of gear with the line-feeder without fail. Furthermore, a pin, $k'$, is secured in the flange $p$ of the line-feeder, and as the line-feeder flies back this pin strikes the inner curved edge of the gravitating-lever and depresses the same with a positive motion.

For the purpose of arresting the action of the feed-lever $t$, and to stop the feed, an eccentric, $v^*$, Fig. 2, is placed close to the edge of said feed-lever. This eccentric is mounted on a shaft, which can be turned by a handle, $t^*$, Fig. 1, and by turning this handle in the proper direction the feed-lever is forced back clear of the cam $v$. The handle $t^*$ is situated in a convenient position to be reached by the attendant.

Figure 4:
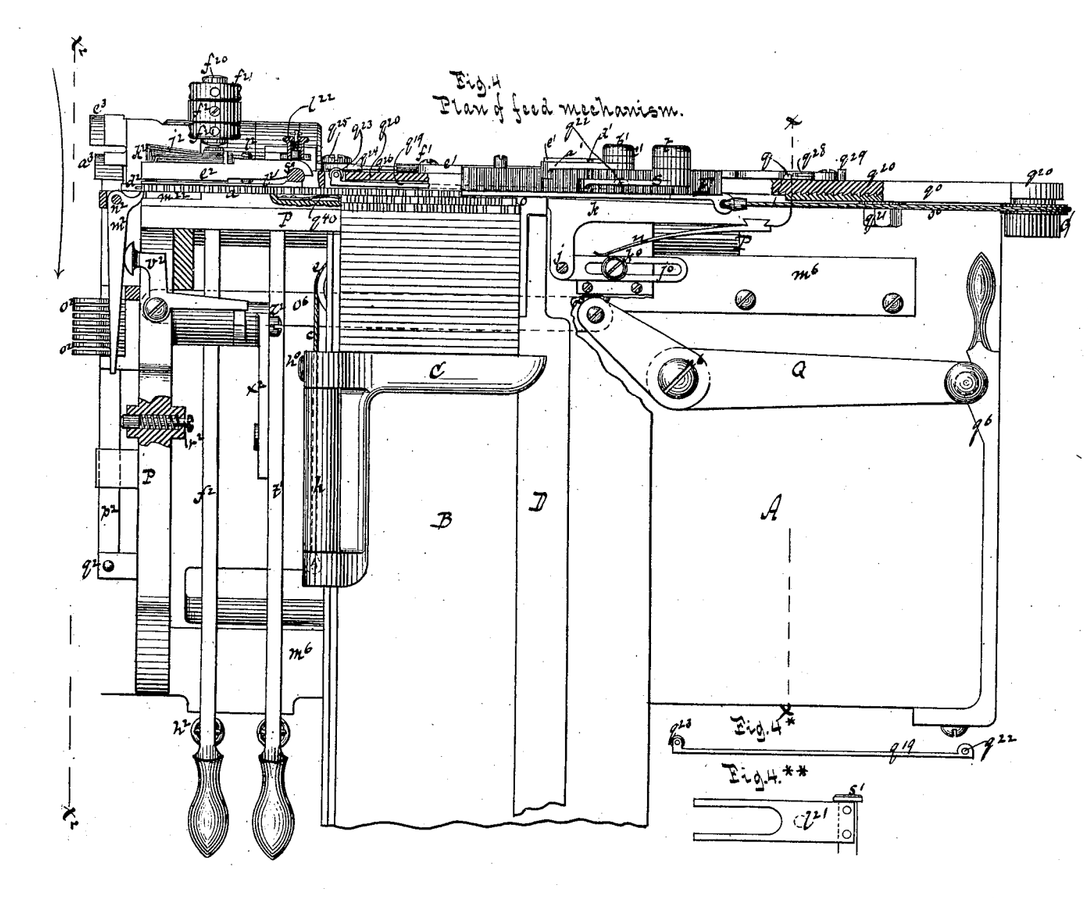

By the action of the line-feeder the type are pushed along in the type-channel $a$, and in the outer wall, $q^{20}$, of this type-channel is a groove to receive a movable plate, $q^{19}$, which swings on a pivot, $q^{22}$, (see Figs. 4 and 4*,) and which extends across the mouth of the galley and bears on its inner end a roller, $q^{23}$, Figs. 1, 4, 4*, and 7. If the line-feeder reaches the inner end of its stroke, it strikes a lever, $q^{24}$, (see Fig. 7,) which has its fulcrum on a pivot, $q^{25}$, secured in the carriage P, which supports the type-channel, and which will be hereinafter more fully described. The lower end of the lever $q^{24}$ connects by a rod, $q^{26}$, with a lever, $q^{27}$, and when the line-feeder presses against the upper end of said lever $q^{24}$ and throws it into position (shown in dotted lines in Fig. 7) the lever $q^{27}$ is forced back into the position shown in dotted lines in the same figure. By the action of the lever $q^{24}$ on the roller $q^{23}$ the plate $q^{19}$ is forced inward against the line of type in the channel $a$, which at that moment has been so far exhausted as to leave room for a fresh line to be received from the galley B. At the moment the line-feeder recedes, and before the fresh line from the galley has been fed into the type-channel, the last type in said channel is prevented from tumbling over by the action of the plate $q^{19}$, and by a spring, $q^{40}$, Fig. 4, which is secured in the inner wall of the channel $a$, and which retains said type after it has been released by the plate $q^{19}$. As soon as the line-feeder has cleared the mouth of the galley and strikes the nose $q$ of the bell-crank lever $k$, so as to release the column side plate, D, the column of type on the galley is moved forward by the action of the column-feeder C and a fresh line of type is forced into the type-channel $a$. On the flange $p$ of the line-feeder is attached a toe, $q^{28}$, Fig. 7, which is yielding in one direction, so that when the line-feeder moves back said toe passes over the upper end of the lever $q^{27}$, which at that time is in the position shown in dotted lines in Fig. 7, resting against the fixed pin $q^{29}$. As soon as those motions have been accomplished the feed-lever $t$ is permitted to follow the action of its spring $w$, and the line-feeder is drawn up in contact with the line of type in the type-channel. During this forward motion of the line-feeder the toe $q^{28}$ strikes the lever $q^{27}$, thereby causing the same, together with the lever $q^{24}$, to move into the position shown in full lines in Fig. 7. The roller $q^{23}$ is released from the action of the lever $q^{24}$, the plate $q^{19}$ falls back into its groove, and the line of type in the type-channel is released from all pressure or undue friction. This will be understood from the following explanation: At the moment the fresh line is forced into the type-channel by the action of the column-feeder C the plate $q^{19}$ is held inward by the lever $q^{24}$, and in this position it projects slightly beyond the inner surface of the wall $q^{20}$ of the type-channel, and the line of type being fed into the type-channel abuts against said plate, and not directly against the inner surface of the wall $q^{20}$. Before the plate $q^{19}$ is relieved from the action of the lever $q^{24}$ the first line of type of the column is locked by the lip $o$ on the column side plate, D, and when the plate $q^{19}$ has been released the line of type in the type-channel has a small play between said first line of the column and the outer wall, $q^{20}$, of the type-channel, so that it moves therein without friction.

In order to adjust the lever $q^{27}$ to columns of different widths, it is mounted on a slotted bracket, $q^{30}$, which is secured in position by a set-screw, $q^{31}$, so that said bracket can be moved toward and from the lever $q^{24}$. The connecting-rod $q^{26}$ is made in sections connected by a suitable coupling, so that it can be lengthened or shortened, as may be required. As the line of type is pushed forward in the type-channel the type are exposed to the action of a roller, $n'$, which is mounted on a slide, $n^{12}$, (see Figs. 1, 2, and 13,) which moves up and down between guides $n^{13}$, and is depressed by a spring, $n^{14}$. A hand-lever, $n^{15}$, serves to raise the slide $n^{12}$ so as to relieve the type from the pressure of the roller $n'$. The object of the roller $n'$ is to keep the type down on the bottom of the type-channel. The mouth of the type-channel $a$ is closed by an abutment, $d^2$, (see Figs. 4, 13, and 13*,) against which the first type in the line is pushed by the action of the line-feeder.

Figure 5:
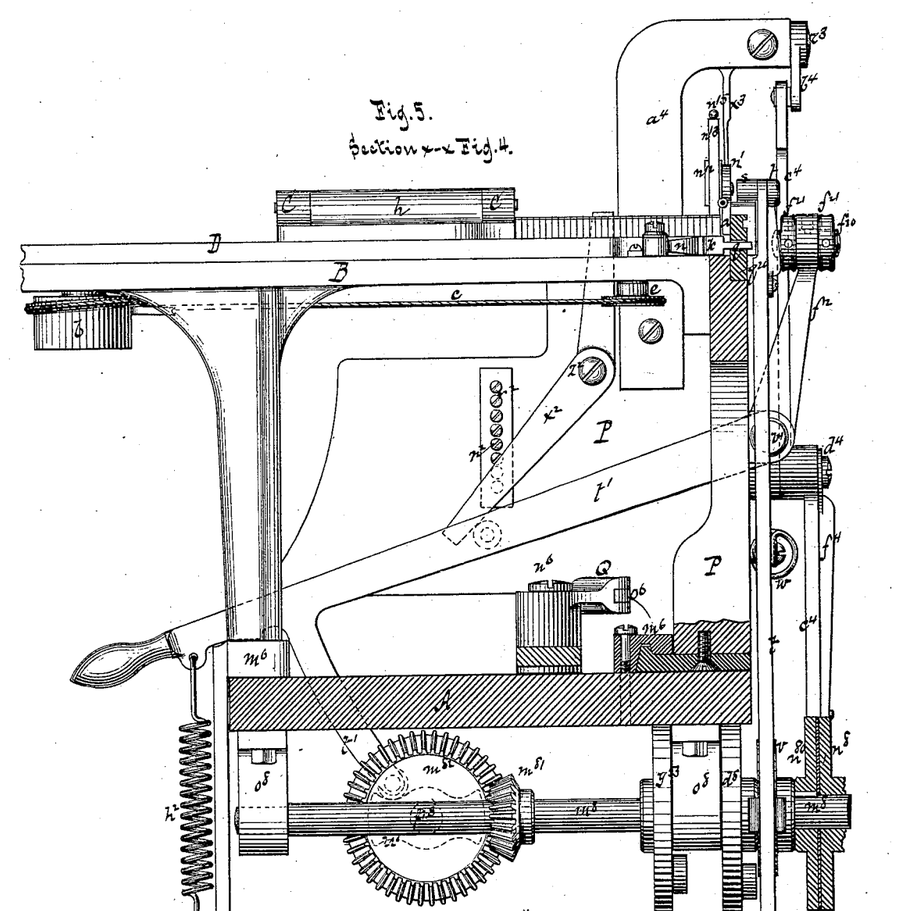

In order to allow the line-feeder to perform its functions with ease, and yet retain the type firmly in position at the required moment, that portion of the outer wall of the type-channel between the roller $q^{23}$ and the abutment $d^2$ is made movable, being composed of an arm, $e^2$, Figs. 2 and 4, which swings on the pivot $s'$, and which is actuated by a lever, $f^2$, and a cam, $g^2$, (see Figs. 1* and 5,) the lever $f^2$ being made to turn on a pivot, $v'$, Figs. 2 and 5, and being depressed upon the face of its cam $g^2$ by a spring, $h^2$. (See Figs. 1 and 4.) When the lever $f^2$ is raised by the cam $g^2$ the arm $e^2$ releases the type in the type-channel, being pushed out by a spring-bolt, $t^2$, (see Fig. 4,) and when the lever is allowed to follow the action of its spring $h^2$ the arm $e^2$ is forced in toward the type.

In the end of the arm $e^2$ next to the abutment $d^2$ is a series of detents, $k^2$, (see Figs. 4 and 6,) being composed of slides fitted in the arm $e^2$ and pressed in toward the type by springs $j^2$. The object of these detents is to retain the type next to the first type in the line, and said detents are placed in such a position that one or more of them are sure to press upon the second type and retain the same while the first type in the line is being lifted up, the motion of the detent-arm being so regulated that the detents and also the free end of the arm $e^2$ are pressed against the type just before the lifter rises.

The spring-bolt $l^2$ acts on a plate, $l^{21}$, which is fastened to the pivot $s'$. The detent-arm $e^2$ is provided with a semicircular recess, which engages with the pivot $s'$, and it is held against said pivot by a spring-latch, $l^{22}$, Figs. 2 and 4. This latch turns on a pivot, $l^{23}$, Fig. 2, and when it is turned down the detent-arm $e^2$, together with the detents, can be taken off. The plate $l^{21}$ bears against the line of type in the type-channel, and if the detent-arm $e^2$ is taken out said plate retains the type in an upright position. The removability of the detent-arm is of considerable advantage, because it permits the front end of the type-channel to be conveniently cleansed. It sometimes occurs that the type are dirty, and the dirt adheres to the detents and causes excessive wear, and if the detent-arm cannot be removed it is exceedingly difficult to clean these parts. The free end of the plate $l^{21}$ is bifurcated, (see Fig. 4**,) leaving a space for the detents to act upon the types. Through the outer end of the lever $f^2$ extends a screw, $f^{20}$, Figs. 4 and 6, which can be adjusted by two nuts. $f^{21}$, so as to preserve its correct action. The detents $k^2$ are made in the form of rectangular plates, (see Fig. 6,) which have openings $k^{20}$, whereby any impurities which may force themselves between them are free to discharge and the correct action of the detents is preserved. Before the lifter begins to act the distributing mechanism receives its signal, whereby the first type, after having been transferred to the distributing mechanism, is caused to pass into its proper type-case. This object is effected as follows: Each type, with the exception of thin-spaces, is provided in its edge with one or more nicks, and as a type advances to the abutment $d^2$ one or more of the nick-levers, $m^2$, drop into the nicks, except in the case of a thin-space. These nick-levers are shown in Figs. 3, 4, 6, 13, and 17. They have a common fulcrum on a vertical pivot, $n^2$, Figs. 4 and 17, and their tails bear against upright intermediate levers, $o^2$, one of which corresponds to each of the nick-levers, (Fig. 6,) and the lower ends of which bear each against one of a series of horizontal levers, $p^2$, which swing on a vertical pivot, $q^2$, and are pushed out against the intermediate levers by means of spring-bolts $r^2$. (See Figs.

Figures 5, 6:
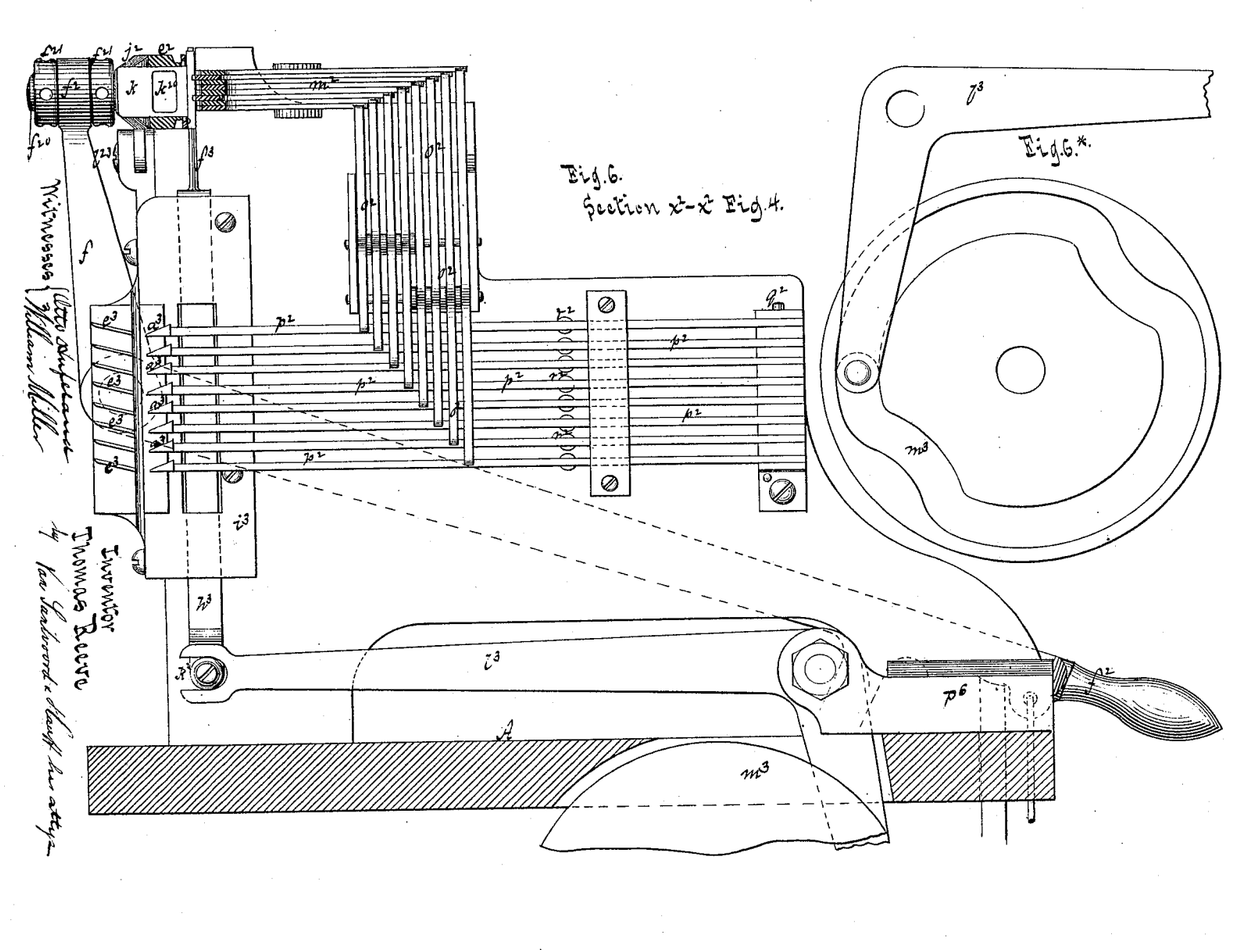

4 and 6.) By the action of these springs, therefore, the intermediate levers are caused to press against the tails of the nick-levers, imparting to said nick-levers a tendency to turn on their fulcrums, so that their points will drop into the nicks of the type opposite to them—that is, the type which is bearing against the abutment $d^2$—whenever they are free to follow the action of the spring-bolts $r^2$. It must be understood that the points of these nick-levers project over the line of type only the thickness of the thinnest nicked type, otherwise the nick-levers would bear against the second type, in some cases, and prevent the first from giving its signal.

Bearing against the tails of the nick-levers $m^2$ is an elbow-lever, $v^2$, which is acted on by a bell-crank lever, $x^2$, Figs. 4 and 5. When this bell-crank lever is moved in the proper direction it causes] the elbow-lever, $v^2$ to bear against the tails of the nick-levers forcing those nick-levers that have fallen into nicks in the first type out of these nicks, Fig. 19.

Figures 13, 16:
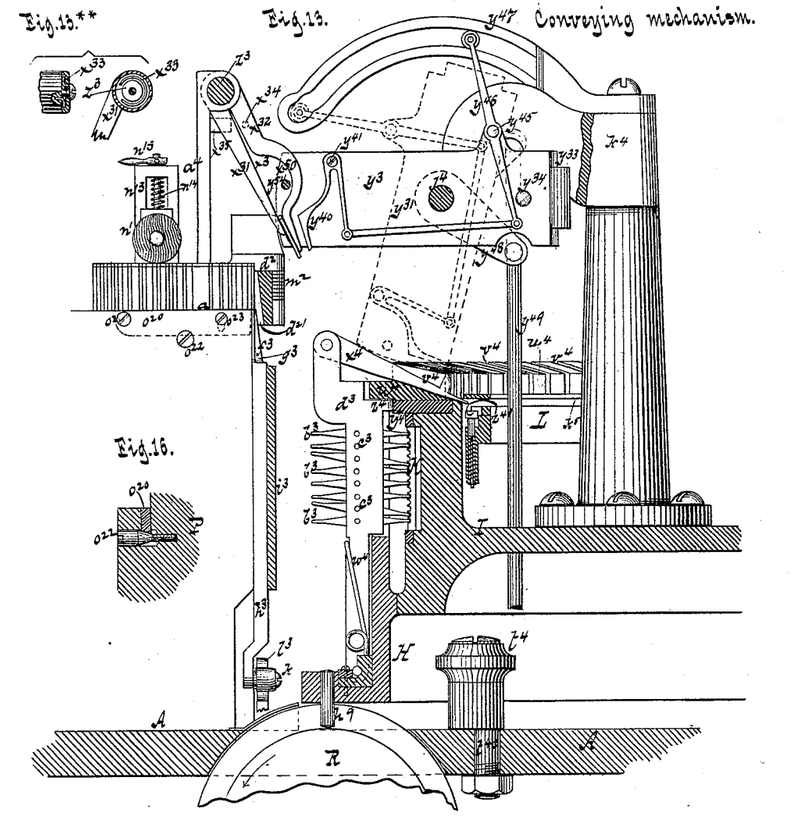
Figures 14, 17, 18, 19, 20, 21, 22, 23:
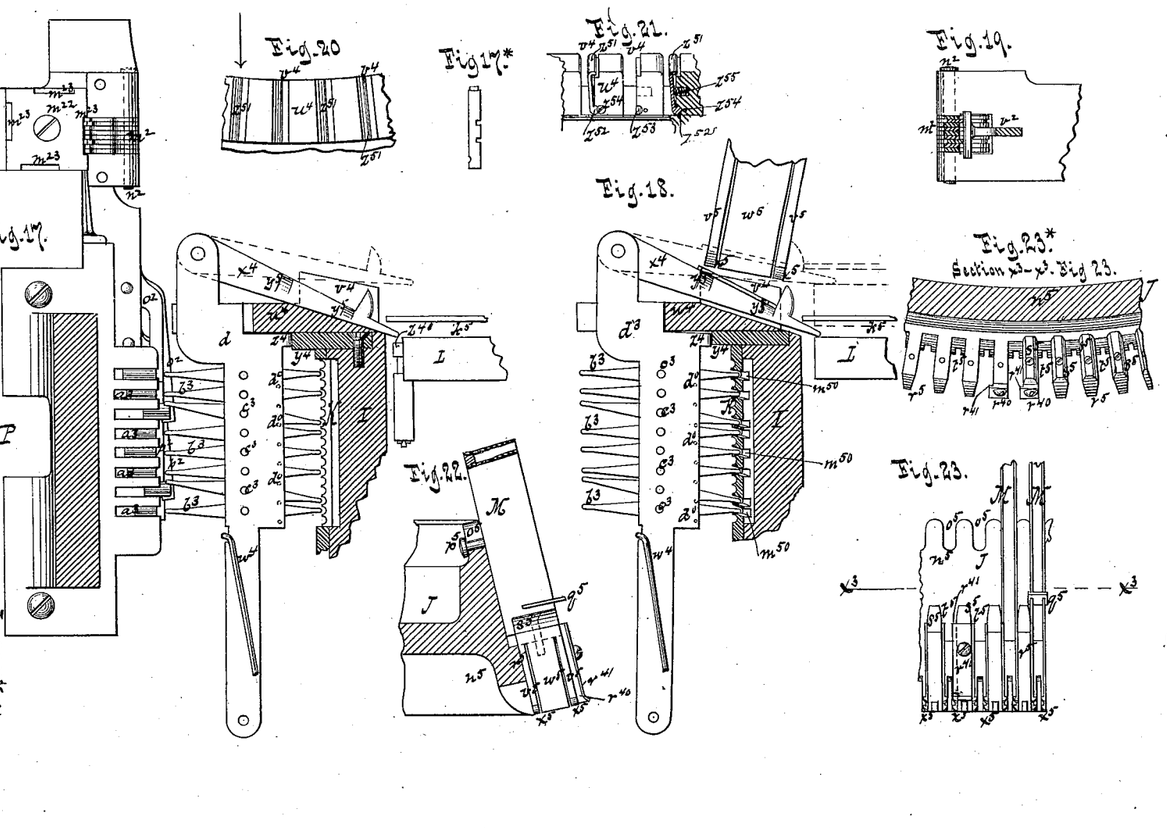

That portion of the type-channel through which extend the points of the nick-levers is protected by a tempered-steel plate, $m^{22}$, which is secured to the type-channel, as shown in Figs. 4 and 17. This plate is square and provided with notches $m^{23}$ in each of its four sides, so that when the notch on one of its sides becomes worn one of the other sides can be brought into working position. In the bottom of the type-channel $a$, close to the abutment $d^2$, is inserted an adjustable tempered plate of steel, $o^{20}$, Figs. 13 and 16. Should the bottom of the type-channel become worn sufficiently to endanger the correctness of the signal to be given by the type, this plate, which is pivoted at $o^{21}$, is raised by means of the tapering screw $o^{22}$ until the proper level is again found, and is then fastened by the set-screw $o^{23}$.

The bell-crank lever $x^2$ has its fulcrum on a pivot, $z^2$, Fig. 5, which is firmly secured on the side of the carriage P which supports the galley C and the type-channel $a$, and is actuated by a lever, $t'$, the motion of which is so timed that by its action on the bell-crank lever $x^2$ the elbow-lever $v^2$ and, consequently, all the nick-levers are recovered before the lifter begins to take action on the type; but previous to this the signal of the nick-levers is transmitted to the distributer in the the following manner: On the end of each of the levers $p^2$, Figs. 4, 6, and 17, is an inclined plane, $a^3$, and all of these inclines stand opposite to a series of fingers, $b^3$, which are secured by pivots $c^3$ to the distributers $d^3$, so that they may turn freely up or down, (Figs. 13, 17, and 18,) but are retained by friction in any position which they may assume, their movements being limited by small pins $d^0$, Figs. 17 and 18. The distributers are secured to a wheel which has an intermittent rotary motion, and just in front of the inclines $a^3$ is a series of recovering-inclines, $e^3$, Figs. 4 and 6, which are secured in a frame firmly secured to the carriage P, and which slope down in opposite directions to the signal-inclines $a^3$, so that the fingers of the distributers in passing these recovering-inclines will have their outer ends thrown in their lower position. If one or more of the nick-levers fall in nicks in the first type in the type-channel, the corresponding signal-inclines are thrown out in the path of the fingers $b^3$ of the distributers, (see Fig. 17.) and as the distributer passes said inclines the corresponding fingers are turned up, as seen in said figure, where, counting from the bottom, the second and sixth fingers of the distributers are turned up, while the remaining have passed the corresponding inclines without coming in contact with them. The type which produces this signal is shown in Fig. 17*.

By inspecting Fig. 6 it will be seen that the incline-levers $p^2$ are pivoted at their ends, whereby the same are enabled to swing in and out without being liable to stick or be retarded in their motion by friction, which is inevitable if the same are made in the form of slides.

Figure 15:
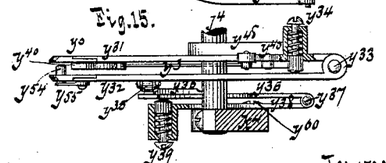

By inspecting Fig. 4 it is seen that the signaling-inclines are in front of the type-channel $a$, the distributers moving past said inclines in the direction of the arrow marked opposite to them, so that each distributer receives a set corresponding to the first letter in the type-channel before it arrives opposite the mouth of said type-channel. So soon as the distributer has passed the signaling-inclines, and before the wheel moves its next step, the nick-levers fall back so as to free the type, and said type is lifted up and delivered to the distributer by the following means: The abutment $d^2$ extends across the whole width of the type-channel, (see Figs. 4 and 13*,) and is provided with a recess, $d^{21}$, Figs. 13 and 13*, while between the end of the type-channel and the abutment is an opening, $d^{23}$, beneath which is situated the lifter $f^3$, (see Figs. 6 and 13,) which is provided with a rib, $g^3$, fitting the recess $d^{21}$ in the abutment, and with two wings, which act on the type so that the same is raised up square without fail. The said lifter is firmly secured to a slide, $h^3$, which moves in a guide, $i^3$. (Best seen in Fig. 6.) On the slide $h^3$ is secured a roller, $k^3$, which engages with a lever, $l^3$. (See Fig. 6.) This lever receives an oscillating motion by a cam, $m^3$, and whenever one of the low portions of this cam comes opposite to the end of said lever the slide $h^3$ is moved up and the first type in the type-channel is lifted by the action of the lifter $f^3$. The cam $m^3$ is, by preference, made in the form of a cam-groove, or as a covered cam, so as to impart to the lifter a positive motion in either direction, and it is so shaped that the upward motion of the lifter is instantaneous, whereby the first type in the line is carried up without disturbing the next to it, which type, being subjected to the action of some of the detents $k^2$, will retain its position close down to the bottom of the channel. If the lifter is made to act slowly or gradually, the friction between the first type and that next to it is liable to occasionally cause the second type to rise somewhat with the first, whereby the correct action of the machine would be disturbed. Immediately after the type has been lifted up, as described, it is grasped by the oscillating nippers $x^3$ and then delivered to the conveyer $y^2$, which serves to deposit the same on the distributer standing ready to receive it. These parts are seen in Figs. 1, 2, 3, 5, and 13. The conveyer is also shown in detail in Figs. 14 and 15. The nippers are composed of two jaws, $x^{31}$ and $x^{32}$, which are mounted on a pin, $z^3$, having its bearing in a standard, $a^4$, which rises from the carriage supporting the type-channel. The pin $z^3$ turns freely in the standard $a^4$, and the jaw $x^{31}$ is firmly secured to said pin, while the jaw $x^{32}$ turns loosely thereon, being drawn up toward the jaw $x^{31}$ by the spring $x^{33}$. (See Fig. 13**.) The jaw $x^{32}$ is longer than the jaw $x^{31}$, so that when the nippers swing back over the type the jaw $x^{31}$ passes over its head, while the jaw $x^{32}$ is arrested, as will be hereinafter more fully explained. The pin $z^3$ extends through the standard $a^4$, and on its rear end is firmly mounted a crank, $b^4$, which is acted on by a lever, $c^4$. (See Figs. 2 and 5.) This lever turns freely on a pivot, $d^4$, and is provided at its lower end with a roller-stud, $e^4$, which is held in contact with a cam, $h^4$, by a spring, $f^4$. When one of the low portions of the cam $h^4$, Fig. 2, comes opposite the roller-stud $e^4$ the nippers $x^3$ swing back, and a pin, $x^{34}$, Figs. 1 and 13, which is secured in the loose jaw $x^{32}$, strikes against a projection, $x^{35}$, extending from the standard $a^4$, so that the motion of the loose jaw is arrested just before it strikes the first type in the channel $a$, while that of the rigid jaw $x^{31}$ proceeds, and thereby the nippers are opened against the action of their springs $x^{33}$. At this moment the action of the lifter $f^3$ takes place, and as the motion of the cam $h^4$ proceeds the lever $c^4$ is thrown in the position shown in Fig. 2, and as the jaw $x^{31}$ of the nippers is carried back toward the jaw $x^{32}$ the nippers close up and grasp the type previously lifted by the action of the lifter $f^3$, and then carry it out to the position shown in Fig. 13. If the loose jaw of the nippers is permitted to strike directly against the first type in the channel $a$, the type, on being pushed up, produces great friction against said jaw, and the jaw is liable to wear out very rapidly. To obviate this difficulty I have applied the stop $x^{35}$, as above stated. By the outward motion of the nippers the type is carried between the jaw of the conveyer $y^3$, and as the nippers are somewhat narrower than the type and the jaws of the conveyer close up the type is grasped by said jaws and taken from the nippers and then deposited on the distributer, as will be presently explained.

The jaws of the conveyer are mounted on a rock-shaft, $j^4$, which has its bearings in a bifurcated standard, $k^4$, (see Figs. 2, 3, and 13,) which rises from the base-cylinder I. Said conveyer consists of two jaws, $y^{31}$ and $y^{32}$, Figs. 14 and 15, which are connected by a hinge-joint, $y^{33}$. The jaw $y^{31}$ is firmly mounted on the rock-shaft, $j^4$, while the jaw $y^{32}$ turns loosely thereon, and is adapted to open from or close up to the rigid jaw. In this rigid jaw is secured a spring-bolt, $y^{34}$, which has a tendency to open the loose jaw. On the outer surface of this loose jaw is secured a friction-roller, $y^{35}$, which, by the action of the spring-bolt $y^{34}$, is held in contact with a cam-plate, $y^{36}$, which swings on a pivot, $y^{37}$, fastened in a swivel-plate, $y^{38}$, which is attached to one of the arms of the standard $k^4$ (see Figs. 2, 14, and 15) by a pivot, $y^{60}$, on which said swivel-plate $y^{38}$, together with the cam-plate $y^{36}$, can be turned so as to carry the end of the cam-plate beneath the roller $y^{35}$. When this is done the jaw $y^{32}$ can be thrown open and the inner surfaces of both the jaws can be conveniently reached. When the cam-plate $y^{36}$ is in its working position it is held in contact with the roller $y^{35}$ by a spring-bolt, $y^{39}$, fitted in a socket at the end of the swivel-plate $y^{38}$. On the inner face of the rigid jaw $y^{31}$ is secured a pusher, $y^{40}$, (see Figs. 13 and 15,) which consists of a U-shaped lever and has its fulcrum on a pivot, $y^{41}$, secured in the fixed jaw $y^{31}$ of the conveyer. Its tail is connected to a lever, $y^{46}$, which swings on a pivot, $y^{45}$, secured in a projection, $y^{44}$, which extends from the upper edge of the rigid jaw $y^{31}$. On the upper end of the lever $y^{46}$ is secured a roller-stud, which engages with a cam, $y^{47}$, secured to the standard $k^4$. (See Figs. 2 and 13.) When the conveyer is moved from the position shown in full lines in Fig. 13 to that shown in dotted lines in said figure the pusher $y^{40}$ is forced outward by the action of the cam on the lever $y^{46}$, and the type previously held between the jaws of the conveyer is deposited on the distributer. The conveyer $y^3$ is moved from the position shown in full lines in Fig. 13 by means of a crank, $y^{48}$, which is firmly secured to the rigid jaw, and which connects by a rod, $y^{49}$, with the lever $y^{50}$. (See Fig. 2.) This lever has its fulcrum on a pivot, $y^{51}$, secured in a bracket attached to the main frame A, and its loose end is armed with a roller-stud, $y^{52}$, (see Fig. 11,) which engages with a cam-groove, $y^{53}$. As the conveyer begins to turn down from the position shown in full lines in Fig. 13 the roller $y^{35}$, on the outer surface of the loose jaw $y^{32}$, travels up on the cam-plate $y^{36}$, and the jaws of the conveyer close up, so as to grasp the type and withdraw the same from the nippers, which at that moment are opened by the following means: The loose jaw $x^{32}$ of said nippers is provided with a crook, $x^{50}$, which catches over a pin, $y^{54}$, fastened in the loose jaw $y^{32}$ of the conveyer. When the conveyer begins to swing down this pin acts on the inner edge of the crook $y^{50}$, and the loose jaw $x^{32}$ of the nippers is forced open, so that the conveyer can withdraw the type from the nippers without producing any perceptible friction on the jaws of the nippers. The pin $y^{54}$ in the loose jaw $y^{32}$ of the conveyer is fastened to a spring, $y^{55}$, Figs. 14 and 15, so that it can give in case it should strike the nippers or otherwise meet with any undue resistance.

Figures 13, 14:
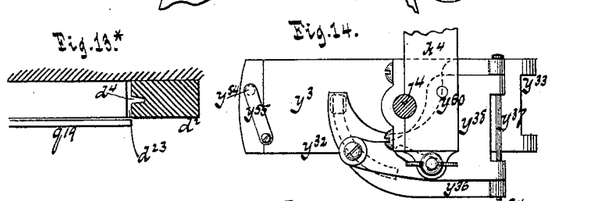

By the time the conveyer has reached the position shown in dotted lines in Fig. 13 the roller $y^{35}$ has passed the high portion of the cam-plate $y^{36}$, and the jaw $y^{32}$ is allowed to open, so as to release the type and permit the same to follow the action of the pusher.

The distributer $d^3$ consists, chiefly, of flat metal plates, which are pivoted at their bottom ends to a ring or wheel, H, which embraces the cylindrical base I, on which rests the type-cone J, said wheel being supported by three or more bolsters, $t^4$, (see Figs. 2 and 13,) secured to the platform or main frame A. (See Figs. 2, and others.) These bolsters are mounted on eccentric studs, $t^{40}$, Fig. 13, so that if they wear out they can be adjusted and kept close up against the inner periphery of the wheel H. From the upper edge of the wheel H projects a rim, $u^4$, which is provided with a number of slots, $v^4$, Figs. 1, 13, 20, and 21, corresponding in numbers and position to the distributers, and forming guides for the same. Weak springs $w^4$ (see Figs. 13, 17, and 18) have a tendency to draw the distributers inward. On each of the distributers is secured a series of fingers, $b^3$, which receive the signals of the type by the action of the nick-levers $m^2$ and the inclines $a^3$, as previously described, and the inner ends of these fingers are opposite a ring, K, which is secured to the base-cylinder I, and which is provided with a system of perforations, a portion of which are shown in Fig. 8.

On the circumference of the cone J are secured the type-cases M, into which the type are to be delivered, and the perforations of the ring K under each case correspond to the signal produced by the nicks in the type which are to go into said type case. As the fingers on the distributers are also set to correspond to the nicks of the type and to the perforations of the ring K, each distributer, on arriving under that type-case where the perforations of the ring K correspond to its set, is allowed to be driven in by the action of its spring $w^4$, and the type previously deposited on said distributer is lifted up into said type-case, as will be hereinafter more fully described; but where the perforations of the ring K do not correspond to the set of the distributer some of the fingers strike the solid portions of the said ring and prevent the distributer from falling in.

The perforations $m^{50}$ Figs. 8 and 18 in the ring K are made on the lines of circles described from any one of the pivots which support the distributers $d^3$, so that the fingers $b^3$ of the distributers are able to pass freely into the same, and the perforations need not be made any wider than requisite to admit the tails of said fingers. Heretofore the perforations $m^{50}$ were made to extend at right angles to the face of the ring K, and since the tails of the fingers $b^3$ move on circles described from the pivots of the distributers they were liable to strike against the edges of the perforations, and the perforations had to be made of such a width that the ring K was unnecessarily weakened.

When a distributer has fallen in it is recovered at the subsequent forward motion of the wheel H by a scalloped rim, $y^4$, secured to the top of the base I, and so constructed that the depressions in said rim are situated one under each type-case, while the projections or raised parts thereof bear against lips $z^{41}$ on the distributers, and force the same back against the action of their springs as the motion of the wheel H progresses. A plan of this scalloped rim is shown in Fig. 9, and a front view of a portion thereof in Fig. 8.

To the top of each distributer is pivoted a lifter, $x^4$, which receives the type from the conveyer $y^3$, as follows: Just below the conveyer the perforated ring K is cut away, as shown in Figs. 8 and 13, so that the fingers of all the distributers can freely follow the action of the recovering-inclines $e^3$; and in order to force the fingers out against the recovering-inclines the circumference of the scalloped rim at that point is continuous, as shown in Fig. 9. The lifter of each distributer, as it passes under the conveyer, is raised by a projection, $z^{41}$, extending from a ring, L. (See Fig. 13.) The ring L is fitted loosely in the base-cylinder I, and it is firmly secured to a vertical spindle, $b^5$, which extends down through the center of the base-cylinder and engages with the lever $c^5$, (see Fig. 2,) to which an oscillating motion is imparted by a cam-groove, $d^5$, also shown in Fig. 10. By the action of this lever, therefore, a rising-and-falling motion is imparted to the ring L, and whenever the said ring rises the projection $z^{41}$ catches the point of the lifter $x^4$ and raises the same close up to the mouth of the conveyer. At the same moment the pusher $y^{40}$ of the conveyer forces the type held by said conveyer out and deposits the same on the raised lifter. The projection $z^{41}$ is made in the form of a spring-bolt, so that when it raises one of the lifters and the pusher $y^{40}$ deposits a type on said lifter the lifter can yield and accommodate itself to the varying thicknesses of the different types, and at the same time, as the pusher recedes, the type is not liable to be thrown off from the lifter. As soon as a type has been thus deposited on the lifter the lifting-ring L is drawn down, carrying down with it the lifter $x^4$, and then the distributer is carried forward by the motion of the wheel H, so that its fingers engage with the grooves of the ring K whenever the lip $z^4$ of the distributer comes opposite to one of the depressions of the scalloped rim. If the perforations of the ring K at that point correspond to the set of the fingers, the distributer falls in, and its type is lifted into its type-case above; but if the perforations of the ring K do not correspond to the set of the fingers, the distributer cannot fall in, and it moves on with its type until it arrives under that case where it can fall in for the purpose of delivering its type. All those distributers which have not delivered their types when they pass the type-channel which is situated over the right-hand end of the opening $k^{30}$ in the ring K, Fig. 8, are forced inward by a roller, $d^{30}$, which is shown in Figs. 3 and 3*. It is fastened to the main frame A, as shown in Fig. 3*, and it serves to press in all those distributers which have not fallen in during their passage round the ring K, either because the types carried by them did not produce a signal, or because the springs $w^4$ did not force in said distributers at the proper moment. The type-channel which receives all such type is termed the "pi-channel."

The provision of the roller $d^{80}$ performs an important function, because if the distributer-spring $w^4$, Fig. 13, fails to act, and one of the distributers should not be forced in by its spring as it arrives opposite the opening $k^{80}$, Fig. 8, said distributer is forced inward by the roller $d^{80}$.

The lifters of all the distributers which are in a position to fall in engage with an annular recess, $k^5$, formed in the lifting-ring L, said recess being opposite to the points of the lifters when the ring is in its lowest position. (See Figs. 2, 17, and 18.) Just below the conveyer, however, a portion of the lifting-ring below the recess $k^5$ is cut away, so that the lifter $x^4$ is raised just high enough to receive the type from the conveyer. By the upward motion of the lifting-ring the lifters of all such distributers which have fallen in at that particular moment are carried up, and the type resting on said lifters are forced in their appropriate type-cases M, as shown in dotted lines in Fig. 18.

It is obvious that the upward and downward motion of the lifting-ring must take place at those times when the distributer-wheel H remains stationary; but the mechanism whereby these motions are produced is so simple that they can be readily understood by the previous description.

The type-cases M are secured to the circumference of the cone J, which is made of cast-iron, the type-cases being secured thereto in such a manner that they can be readily taken off when filled and transferred to the setting-machine or the type can be lifted out, as best suits the attendant.

Figures 24, 25, 26:
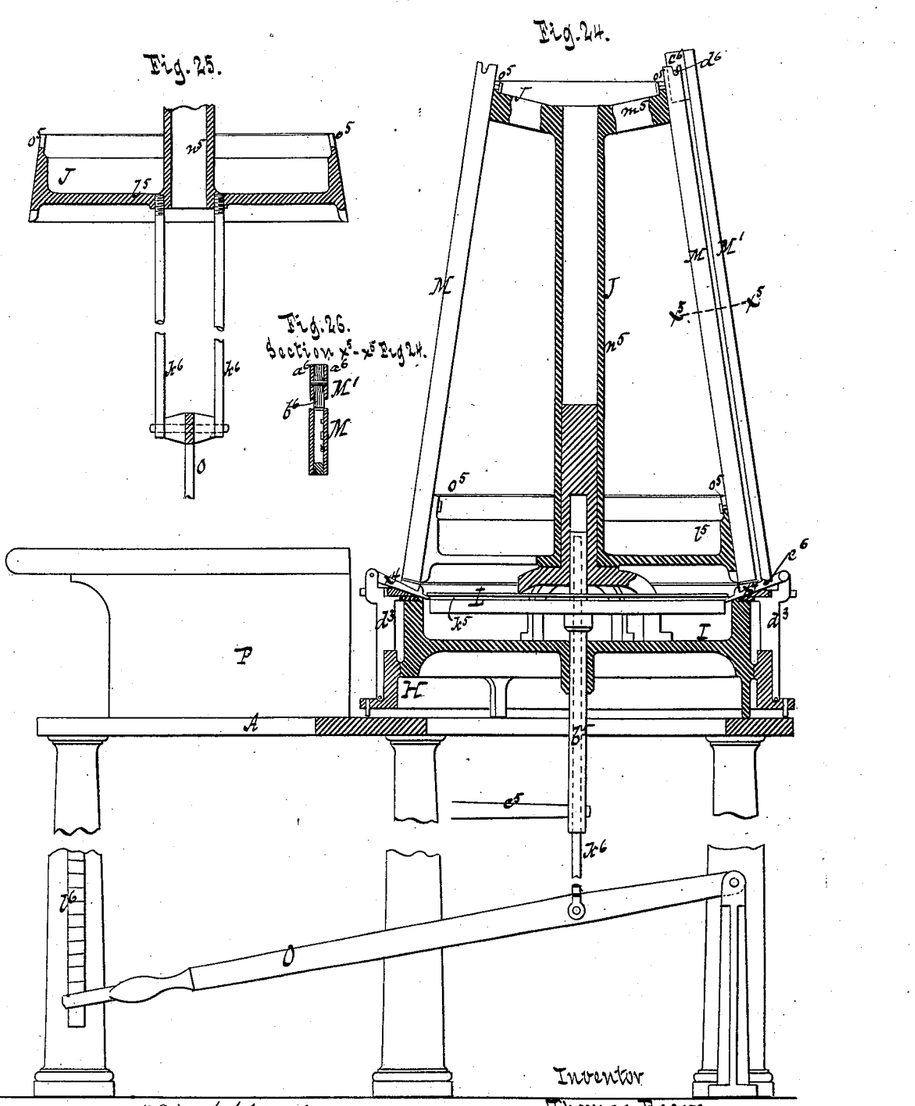

The cone consists of two sections, $l^5 m^5$, which are cast solid with the central hub, $n^5$, one at the top and one at the bottom, and each of which is provided with a series of recesses, $o^5$, to admit pins $p^5$, which project from the backs of the type-cases, (see Figs. 22, 23, and 24,) said pins being provided with heads, so that when they are caused to engage with the recesses $o^5$ the type-cases are securely retained in position. Each of the type-cases is provided near its bottom with a slot to receive a slide, $q^5$, which serves to support the line of type contained in a case when the same is to be taken off from the cone. From the bottom of the lower section, $l^5$, of the cone projects a rim, $r^5$, on which a ring, $s^5$, is secured, and both the rim $r^5$ and the ring $s^5$ are milled out to form spaces $t^5$ for the reception of the bottom ends of the cases. (See Figs. 22, 23, and 23*.) To the inner surfaces of the recesses $t^5$ in the ring $s^5$ are secured thin pieces of steel, each of which is divided into a middle section, $w^5$, and two outside sections, $v^5$, each of which forms a separate spring. The distance between the inner surfaces of these springs is equal to the width of the distributer-lifter $x^4$, and the outside springs are provided on their inner surfaces each with a nose, $x^5$, (see Fig. 23,) and the distributer-lifters $x^4$ are provided with chamfered recesses $y^5$, opposite to the outside springs, $v^5$. (See Fig. 18.) If one of the distributer-lifters is raised up to the position shown in dotted lines in Fig. 18, the noses $x^5$ slide over the type resting on said lifter, while the middle springs, $w^5$, prevent said type from moving sidewise, and after the noses $x^5$ have passed the type they drop into the recess $y^5$ in the lifter, so that they catch beneath the type and retain the same while the lifter recedes to the position shown in full lines in Fig. 18.

To the rim $r^5$, between the spaces $t^5$, are fastened guides $r^{40}$. These guides have projections $r^{41}$, which pass over the shoulder of the type as the same is being pushed up into type-cases M and retain the same against the back of said type-cases. (See Figs. 22, 23, and 23*.)

The several distributers work in the radial slots $v^4$ (see Figs. 20 and 21) in the upper surface of the distributer-wheel H, and the lower ends of the springs $v^5 u^5$ are in close proximity to the upper surface of said wheel, (see Fig. 18,) so that the type cannot drop off from the distributer-lifters while they are being raised up between the springs.

In the radial slots $u^4$ are placed friction-plates $z^{51}$, (see Figs. 20 and 21,) for the purpose of preventing accidental displacement of the lifters and of the type resting thereon after the same have been depressed by the pusher $y^{40}$ of the conveyer. These plates are constructed with a cylindrical rib, $z^{52}$, at their lower ends and rounded off at their upper ends, (see Fig. 21,) and the cylindrical ribs are inserted in holes $z^{53}$, bored into the partitions between the radial slots $v^4$, near to their edges, so that said holes open into the slots. Suitable screws, $z^{54}$, retain the friction-plates in the holes $z^{53}$. Springs $z^{55}$ act on the friction-plates so that they retain the types on the lifters, while they are free to yield as the lifters are raised or depressed.

One or more of the type-cases may be provided with a knocker, M', which serves to retain the type in the proper position. Each of these knockers (see Figs. 24 and 26) consists of two strips of metal, $a^6$, between which are secured a strip of wood, $b^6$, and a piece of metal, $c^6$, the latter being situated between the top ends of the strips $a^6$. In the metal piece $c^6$ is secured a pin, $d^6$, which engages with a recess in the top end of the appropriate type-case M, so that the lower end of the knocker can swing in and out. The bottom end of one of the strips is beveled off, (see Fig. 24,) and each of the lifters is provided with a pin, $e^6$, which projects from one of its sides, so that whenever one of the lifters rises to deliver a type into one of the type-cases M its pin $e^6$ acts on the beveled edge of the appropriate knocker M' and forces the same back, and when the lifter drops the knocker strikes against the faces of the type in the type-cases M. By this means such of the types as have moved forward are forced back to the bottom of the type-cases.

In order to obtain access to the parts beneath the cone J, a lifting mechanism is provided which serves to raise said cone and to sustain it at a convenient height. This lifting mechanism consists of a lever, O, which connects by two rods, $k^6$, Figs. 24 and 25, with the cone J. The outer end of the lever O engages with a rack-bar, $l^6$, Fig. 24, so that when said lever is raised it is retained in the desired position.

The galley, together with the mechanism for feeding the column and the lines and for transferring the type, one after the other, to the distributing mechanism, is secured on a carriage, P, which slides on guide-rails $m^6$, (see Figs. 3, 4, and 5,) so that the same, together with all parts connected to it, can be moved away from the distributing mechanism, and that convenient access can be had to the conveyer $y^3$ and the mechanism connected thereto, and also to the lifter and to the signaling mechanism, which latter parts occupy the inner end of the carriage P.

A hand-lever, Q, Figs. 1, 4, and 5, serves to move the carriage toward and from the distributing mechanism. This lever has its fulcrum on a pivot, $n^6$, which is secured on the platform A, and it connects, by means of a rod, $o^6$, with the carriage. When the carriage is moved toward the distributing mechanism it is arrested in the desired position by a stop, $p^6$, (see Figs. 1 and 3,) and the lever Q is locked by a spring-latch, $q^6$, Figs. 1, 3, and 4, which is fastened to the platform A. By forcing back the spring-latch $q^6$ the lever Q is released and the carriage can be moved away from the distributing mechanism.

The mechanism which imparts a step-by-step motion to the distributer-wheel H consists of a wheel, R, (see Figs. 2 and 12,) on the periphery of which are formed two cams, $h^8$, which engage with pins $h^9$, secured in the under surface of the wheel H. As the wheel R revolves in the direction of the arrow marked on it in Fig. 2 it imparts to the wheel the desired motion, propelling it two steps for each of its revolutions. The wheel R dips into a trough, R', Fig. 2, which contains oil, so that the cams $h^8$ and pins $h^9$ are constantly kept lubricated when the machine is in operation. In the platform A, beneath the pins $h^9$, is a circular groove, $h^{90}$, which communicates with the trough R' through a channel, $h^{91}$, Fig. 2, so that the surplus oil which drips from the pins $h^9$ and collects in the groove $h^{90}$ finds its way back into the trough.

It remains to explain the position of the several cams in relation to the driving-shaft $m^8$.

By referring to Figs. 1, 2, and 5 it will be seen that said shaft is situated beneath the platform A, and that on one of its ends is firmly mounted a flange, $n^{80}$, which is faced with a disk of leather or other equivalent material, and against this flange is placed the hub of the driving-wheel $n^8$, being pressed up by a nut, so that the said driving-wheel is held by friction, and that it can give if it meets with an undue resistance.

The driving-shaft has its bearings in suitable journal-boxes, $o^8$, secured to the platform A, and on it are mounted the cam $v$, which imparts motion to the lever $t$, the cam $d^5$, which imparts motion to the lifting-ring L, and the cam $y^{53}$, which imparts motion to the conveyer $y^3$. The shaft $m^8$ is geared by bevel-wheels $m^{81}$ and $m^{82}$ with the shaft $p^8$, (see Figs. 1 and 5,) which has its bearings in boxes $q^8$, and is geared by bevel-wheels $p^{81}$ and $p^{82}$ with the shaft $r^8$, running parallel with the driving-shaft $m^8$, and making one revolution to each two revolutions of said driving-shaft. On the shaft $p^8$ are mounted the cam $u'$, which imparts motion to the lever $t'$, the cam $g^2$, which imparts motion to the lever $f^2$, and the cam $m^3$, which imparts motion to the lifter $l^3$. (See Figs. 1, 1*, and 5.) From this description it will be seen that the entire driving mechanism is secured to the platform A, leaving the carriage P free to be moved in and out, as above described.

As already stated, my invention is intended as an improvement on the patent of Augustus C. Richards, No. 212,503, dated February 18, 1879, and therefore I disclaim everything shown and described in said patent.

What I claim as new, and desire to secure by Letters Patent, is—

1. The combination, with the galley B, of the slide arranged upon the front edge of the galley and adapted to move longitudinally thereon, and the column-feeder C, hinged to the upper edge of the slide and moving with the same, all substantially as and for the purpose described.

2. The combination, with the galley B, the slide $h$ and the column-feeder C, which is hinged to said slide, of a spring, $h^0$, acting on one of the knuckles of the column-feeder and serving to retain said column-feeder in position when it is raised or depressed, substantially as set forth.

3. The combination, with the line-feeder E and the type-channel $a$, of a stop, $q^0$, which is fastened to the outer wall of said type-channel and held in position by teeth and a screw, substantially as shown and described.

4. The combination, with the line-feeder E, the type-channel $a$, and the column-feeder C, of an abutting-plate $q^{19}$ and devices, substantially as described, connecting the abutting-plate with the line-feeder for moving said plate out beyond the inner surface of the outer wall of the type-channel by the action of the line-feeder, so as to form an abutment for the column as the same is pushed forward by the column-feeder, substantially as and for the purpose set forth.

5. The combination, with the line-feeder E and the type-channel $a$, of a plate, $q^{19}$, fitted into a groove in the outer wall of the type-channel, and constructed to swing on a pivot passing through its rear end, a roller, $q^{23}$, secured in the front end of said swinging plate, and a lever, $q^{24}$, projecting into the path of the line-feeder, whereby, when the line-feeder has reached the forward end of its stroke, the free end of the swinging plate is locked against the last type in the type-channel, substantially as and for the purpose described.

6. The combination, with the line-feeder E, the type-channel $a$, the movable plate $q^{19}$, and the locking-lever $q^{24}$, of a releasing-lever, $q^{27}$, which is connected to the locking-lever and acted on by the line-feeder, substantially in the manner set forth.

7. The combination, with the line-feeder E, the type-channel $a$, the movable plate $q^{19}$, the locking-lever $q^{24}$, and the releasing-lever $q^{27}$, of a toe, $q^{28}$, secured to the line-feeder and constructed to act on the releasing-lever as the line-feeder begins its forward movement, substantially as described.

8. The combination, with the line-feeder E, the type-channel $a$, the movable plate $q^{19}$, the locking-lever $q^{24}$, and the releasing-lever $q^{27}$, of an extensible rod, $q^{26}$, and an adjustable bracket, $q^{30}$, for adjusting the position of the releasing-lever to the width of the column, substantially as set forth.

9. The combination, with the type-channel $a$, and with the detent-arm $e^2$, of a plate, $l^{21}$, secured to the pivot $s'$ of the detent-arm, for retaining the line of type in the channel when the detent-arm is removed, substantially as described.

10. The combination, with the type-channel $a$, and with the detent-arm $e^2$, of a pivot, $s'$, fitting into a semicircular recess in the detent-arm, and a spring-latch, $l^{22}$, for retaining the detent-arm on its pivot, and for releasing the same when it is to be removed, substantially as set forth.

11. The combination, with the type-channel $a$, of a plate, $o^{20}$, and screw $o^{22}$, acting on said plate for adjusting the same when the bottom of the type-channel should become worn, substantially as described.

12. The combination, with the intermittently rotating or oscillating pin $z^3$, of the jaw $x^{31}$, rigidly secured to and moving with the pin, the jaw $x^{32}$, arranged to turn loosely on the latter and provided with a projection, $x^{34}$, a spring, $x^{33}$, for drawing the loose jaw toward the movable jaw, and a stop, $x^{35}$, all arranged substantially as described, to grasp the type as it is lifted and deliver it to the type-conveyer $y^3$, as set forth.

13. The combination, with the loose jaw $y^{32}$ of the conveyer, and with the roller $y^{35}$, fastened to said loose jaw, of a plate, $y^{38}$, adapted to turn on a pivot, $y^{60}$, and a cam-plate, $y^{36}$, which is hinged to the plate $y^{38}$ and acts on the roller $y^{35}$ so that by turning the plate $y^{38}$ on its pivot the cam-plate releases the roller $y^{35}$ and allows the loose jaw $y^{32}$ to be opened, substantially as described.

14. The combination, with the conveyer $y^3$, and with the nippers $x^3$, of a pin, $y^{54}$, secured to the conveyer, and a crook, $x^{50}$, formed on the loose jaw of the nippers and engaging with the pin $y^{54}$, whereby said loose jaw of the nippers releases the type and allows the conveyer to withdraw it without producing any perceptible friction, substantially as set forth.

15. The combination, with the distributers $d^3$, and with the wheel H which carries the same, of bolsters $t^4$, acting on the inner periphery of said wheel, and eccentric studs $t^{40}$, which support said bolsters and allow of adjusting them in the proper relation to the wheel, substantially as described.

16. The combination, with the distributers $d^3$, which swing on pivots, and with the fingers $b^3$, attached to said distributers, of the ring K, having segmental perforations $m^{50}$ made on the lines of circles described from the pivots which support the distributers, substantially as and for the purpose set forth.

17. The combination, with the conveyer $y^3$ and its pusher $y^{40}$, and with the distributer-lifters $x^4$, of a spring-supported projection, $z^{41}$, on the lifting-ring L, to enable each lifter, as it receives a type from the conveyer, to adjust itself to the thickness of the type, substantially as described.

18. The combination, with the revolving wheel H, the movable distributers $d^3$, and the perforated ring K, of the roller $d^{80}$, connected with the main frame and arranged to force the distributers inward, substantially as herein described.

19. The combination, with the cone J, its rim $r^5$, its spaces $t^5$, and the distributer-lifter $x^4$, of guides $r^{40}$, having projections constructed to extend over the shoulders of the type as the same are pushed up by the lifters, substantially as and for the purpose described.

20. The combination, with the wheel H, provided with radial slots $u^4$, having their side walls constructed at the bottom with recesses $z^{53}$, of the friction-plates $z^{51}$, having ribs $z^{52}$ arranged in the said recesses, and a spring arranged to press said plates outward, all substantially as and for the purpose described.

In testimony whereof I have hereunto set my hand and seal in the presence of two subscribing witnesses.

THOS. REEVE. [L. S.]

Witnesses:
OTTO HUFELAND,
A. AUGS. LOW.